United States Patent
Sato et al.

(10) Patent No.: US 12,319,182 B2
(45) Date of Patent: Jun. 3, 2025

(54) CONVEYANCE SEAT

(71) Applicants: TS TECH CO., LTD., Saitama (JP); HONDA MOTOR CO., LTD., Tokyo (JP)

(72) Inventors: Takeshi Sato, Tochigi (JP); Kazuya Miyawaki, Tochigi (JP); Hidetaka Yonehara, Tochigi (JP); Daichi Mochizuki, Tochigi (JP); Hirohisa Abe, Tochigi (JP); Yushiro Tachibana, Tokyo (JP); Yasunobu Kawamoto, Tokyo (JP); Daisuke Ohkawa, Tokyo (JP); Yusuke Ogata, Tokyo (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/809,964

(22) Filed: Aug. 20, 2024

(65) Prior Publication Data

US 2025/0065788 A1   Feb. 27, 2025

(51) Int. Cl.
*B60N 2/68* (2006.01)
*B60N 2/20* (2006.01)
*B60N 2/90* (2018.01)
*B60R 22/34* (2006.01)

(52) U.S. Cl.
CPC ............ *B60N 2/688* (2013.01); *B60N 2/20* (2013.01); *B60N 2/919* (2018.02); *B60R 22/34* (2013.01)

(58) Field of Classification Search
CPC .......... B60N 2/688; B60N 2/919; B60N 2/20; B60R 22/34
See application file for complete search history.

(56) References Cited

U.S. PATENT DOCUMENTS

| | | | |
|---|---|---|---|
| 5,716,102 A * | 2/1998 | Ray ...................... | B60R 22/26 297/216.13 |
| 10,086,723 B1 * | 10/2018 | Watanabe ............... | B60N 2/688 |
| 11,007,911 B2 * | 5/2021 | Yonehara ................. | B60N 2/36 |
| 2017/0368975 A1 * | 12/2017 | Miyawaki ............. | B60N 2/682 |
| 2020/0001758 A1 * | 1/2020 | Di Giusto ............. | B60N 2/919 |
| 2023/0302968 A1 * | 9/2023 | Koreishi .................. | B60N 2/80 |

FOREIGN PATENT DOCUMENTS

JP   2012-162225 A   8/2012

* cited by examiner

*Primary Examiner* — Toan C To
(74) *Attorney, Agent, or Firm* — Dority & Manning, P.A.

(57) ABSTRACT

The conveyance seat includes a back frame and a belt retractor that is attached to the back frame, and that retracts a seat belt. The back frame includes a rear frame having a plate shape and a front frame that is assembled to a front surface of the rear frame. A first through-hole is formed in the rear frame, and a second through-hole is formed in the front frame at a position facing the first through-hole. The belt retractor is provided inside the first through-hole and the second through-hole, and is disposed at a position overlapping the rear frame and the front frame in a thickness direction of the back frame.

10 Claims, 9 Drawing Sheets

CONVEYANCE SEAT

CROSS-REFERENCE TO RELATED APPLICATIONS

This application claims priority to Japanese Patent Application No. 2023-135627, filed on Aug. 23, 2023, which is hereby incorporated herein by reference in its entirety for all purposes.

BACKGROUND OF THE INVENTION

Field of the Invention

The present invention relates to a conveyance seat, particularly to a conveyance seat including a belt retractor that is attached to a seat back, and that retracts a seat belt.

Description of the Related Art

In the related art, a vehicle rear seat including a back frame serving as a skeleton of a seat back and a belt retractor that is attached to a front surface of the back frame and that retracts a seat belt has been known (for example, JP 2012-162225 A).

A vehicle seat disclosed in JP 2012-162225 A includes a back frame and a belt retractor that is attached to a front surface of a back frame.

The back frame includes a rear frame having a plate shape and forming an outer shape of the back frame, and a front frame that is assembled to a front surface of the rear frame. A through-hole penetrating through the front frame in a thickness direction of the front frame is formed in the front frame. Furthermore, the belt retractor is provided inside a through-hole of the back frame, and is disposed at a position overlapping the front frame in a thickness direction of the back frame.

In a conveyance seat including a belt retractor as disclosed in JP 2012-162225 A, the belt retractor is assembled to a front surface of a back frame.

For that reason, a seated occupant feels discomfort at a location on a seat back where the belt retractor is assembled, which is a risk. Namely, seating feeling of the seated occupant is affected, which is a risk.

The present invention has been made in view of the above-described problems, and an object of the present invention is to provide a conveyance seat that provides an improved seating feeling than in the related art.

Another object of the present invention is to provide a conveyance seat including a belt retractor, and capable of suppressing discomfort of a seated occupant at a location where the belt retractor is assembled.

SUMMARY OF THE INVENTION

The above-described problems are solved by a conveyance seat of the present invention including: a back frame serving as a skeleton of a seat back; and a belt retractor that is attached to the back frame, and that retracts a seat belt. The back frame includes a rear frame having a plate shape and constituting the back frame, and a front frame that is assembled to a front surface of the rear frame. A first through-hole penetrating through the rear frame in a thickness direction of the rear frame is formed in the rear frame. A second through-hole provided at a position facing the first through-hole and penetrating through the front frame in a thickness direction of the front frame is formed in the front frame. The front frame is assembled to the rear frame in a state where the first through-hole and the second through-hole communicate with each other. The belt retractor is provided inside the first through-hole and the second through-hole of the back frame, and is disposed at a position overlapping the rear frame and the front frame in a thickness direction of the back frame.

With the above-described configuration, the conveyance seat that includes the belt retractor and that provides an improved seating feeling can be realized.

In detail, the belt retractor is provided inside the first through-hole and the second through-hole of the back frame, and is disposed at a position overlapping the rear frame and the front frame in the thickness direction of the back frame. Namely, the forward projection of the belt retractor from the back frame can be suppressed, and discomfort of a seated occupant at a location on the seat back where the belt retractor is assembled is suppressed.

In more detail, generally, a conveyance seat mainly includes a seat frame, a pad material, and a skin material, and the thickness of the pad material can be ensured by suppressing the forward projection of the belt retractor from the back frame as much as possible. For that reason, seating feeling can be improved.

In this case, it is preferable that a rear end portion of the belt retractor is disposed at a position behind the rear frame in the thickness direction of the back frame.

With the above-described configuration, the forward projection of the belt retractor from the back frame can be further suppressed, and seating feeling can be further improved.

In this case, it is preferable that the first through-hole and the second through-hole are formed to be larger than the belt retractor in an up to down direction and a width direction of the back frame.

With the above-described configuration, the assembly work of the belt retractor can be facilitated.

In this case, it is preferable that the belt retractor rotationally rotates to retract the seat belt, and it is preferable that a rotating shaft of the belt retractor is disposed at a position behind the front frame in the thickness direction of the back frame.

In addition, it is preferable that the belt retractor rotationally rotates to retract the seat belt, and it is preferable that a rotating shaft of the belt retractor is disposed at a position in front of the rear frame in the thickness direction of the back frame.

With the above-described configuration, the rotating shaft of the belt retractor can be suitably protected in the thickness direction of the back frame.

In this case, it is preferable that the back frame includes a retractor bracket for attaching the belt retractor, and it is preferable that the retractor bracket is provided inside the first through-hole and the second through-hole, and is disposed at a position overlapping the rear frame and the front frame in the thickness direction of the back frame.

By providing the retractor bracket as described above, the belt retractor can be suitably assembled to the back frame. In addition, the forward projection of the belt retractor from the back frame can be suppressed.

In this case, it is preferable that the retractor bracket includes a retractor attachment portion for attaching the belt retractor, and it is preferable that the retractor attachment portion is disposed at a position behind the front frame in the thickness direction of the back frame.

With the above-described configuration, the belt retractor can be suitably protected from a seat front side.

In this case, it is preferable that the retractor bracket includes a frame attachment portion for attachment to a front surface of the front frame, and it is preferable that a front reinforcing portion is formed at a portion of the front surface of the front frame, the frame attachment portion being attached to the portion.

In addition, it is preferable that a rear reinforcing portion extending along an edge portion of the first through-hole of the rear frame is formed at the edge portion of the first through-hole.

With the above-described configuration, the rigidity of a portion of the back frame, the belt retractor being assembled to the portion, can be improved.

In this case, it is preferable that the conveyance seat further includes a switching device that switches the seat back between a normal state and a movement state where the seat back is moved from the normal state. It is preferable that the switching device is provided at a side portion of the back frame, and includes a lock member that locks a movement operation of the seat back when the seat back is in the normal state, and it is preferable that the lock member and the belt retractor are disposed at the same height position on the back frame.

With the above-described configuration, the rigidity of the portion of the back frame, the belt retractor being assembled to the portion, can be improved. Namely, even when a load is applied to the seat back (back frame) from the outside, the assembly rigidity of the belt retractor can be suitably ensured by disposing the belt retractor at a position relatively close to the lock member.

According to the present invention, the conveyance seat that provides an improved seating feeling than in the related art can be realized. In addition, in the conveyance seat including the belt retractor, discomfort of the seated occupant even at a location where the belt retractor is assembled can be suppressed.

In addition, according to the present invention, the forward projection of the belt retractor from the back frame can be suppressed, and seating feeling can be improved.

In addition, according to the present invention, the assembly work of the belt retractor can be facilitated.

In addition, according to the present invention, the rotating shaft of the belt retractor can be suitably protected in the thickness direction of the back frame.

In addition, according to the present invention, by providing the retractor bracket, the belt retractor can be suitably assembled to the back frame.

In addition, according to the present invention, the belt retractor can be suitably protected from the seat front side.

In addition, according to the present invention, the rigidity of the portion of the back frame, the belt retractor being assembled to the portion, can be improved.

DESCRIPTION OF THE PREFERRED EMBODIMENTS

Hereinafter, an embodiment of the present invention will be described with reference to FIGS. 1 to 9.

The present embodiment relates to a conveyance seat including a back frame and a belt retractor that is assembled to the back frame to retract a seat belt, and capable of suppressing discomfort of a seated occupant at a location where the belt retractor is attached.

A side on which the seated occupant is seated with respect to a seat back of the conveyance seat is a "front side". In addition, a traveling direction of a conveyance is a "front to rear direction", and a right to left direction when the conveyance faces the traveling direction is a "right to left direction" of the conveyance seat.

Figure 1:
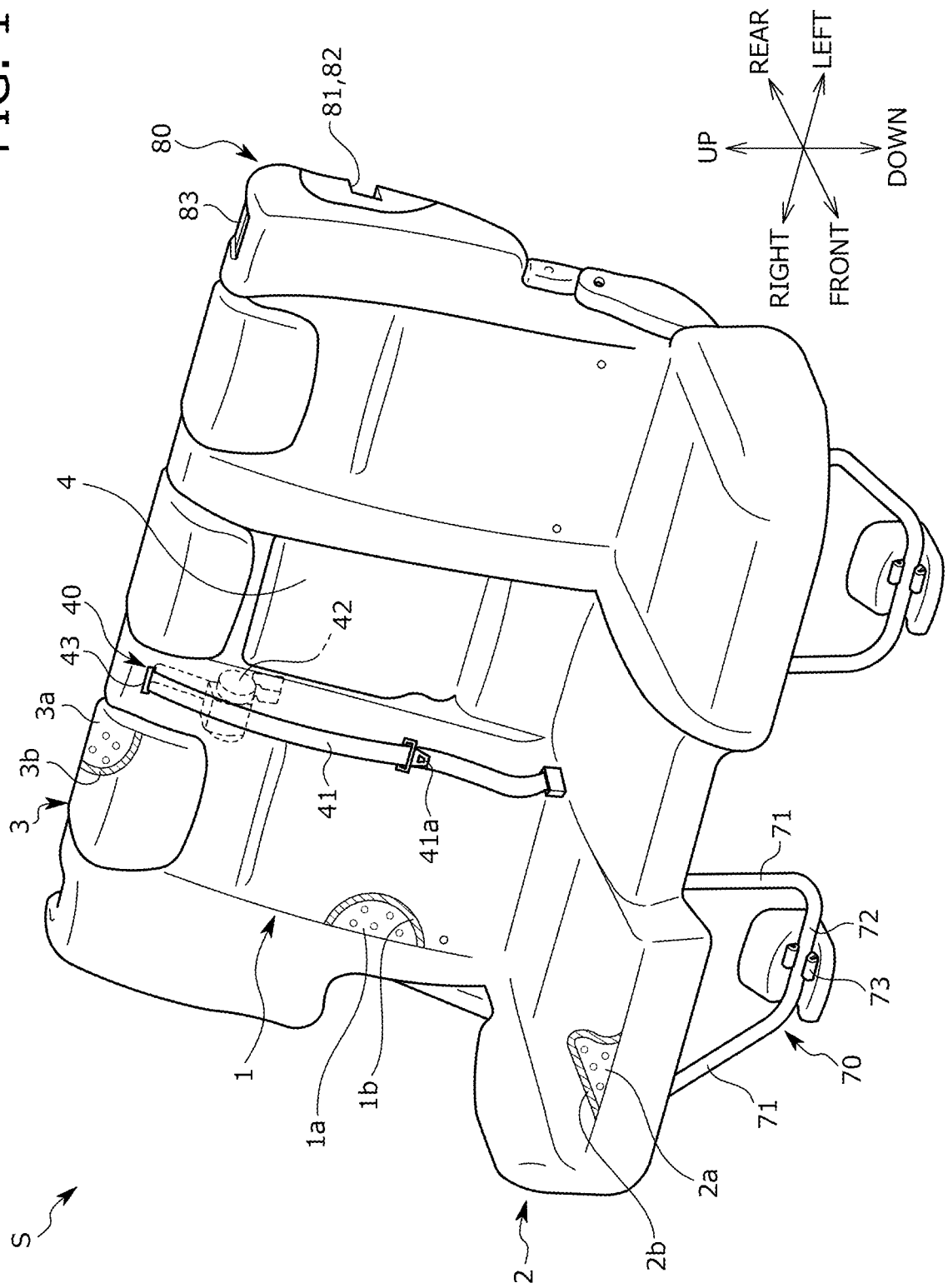
FIG. 1 is a perspective view of a conveyance seat of the present embodiment.

As shown in FIG. 1, a conveyance seat S is, for example, a rear seat corresponding to a rear seat of a vehicle, and includes a main seat and a sub-seat provided side by side in a seat width direction.

The conveyance seat S is a seat capable of providing seat arrangement in two types of modes: a "normal state" where an occupant can be seated, and a "storage state (movement state)" where a seat body is stored on a storage floor.

Specifically, when the occupant operates an operating lever 83 shown in FIG. 1 from the "normal state", the conveyance seat S is switched to the "storage state" where the seat body is tilted forward to be folded and is stored on a vehicle body floor. In addition, the occupant returns the conveyance seat S to the "normal state" from the "storage state" by manually raising the seat body upward.

Figure 2:
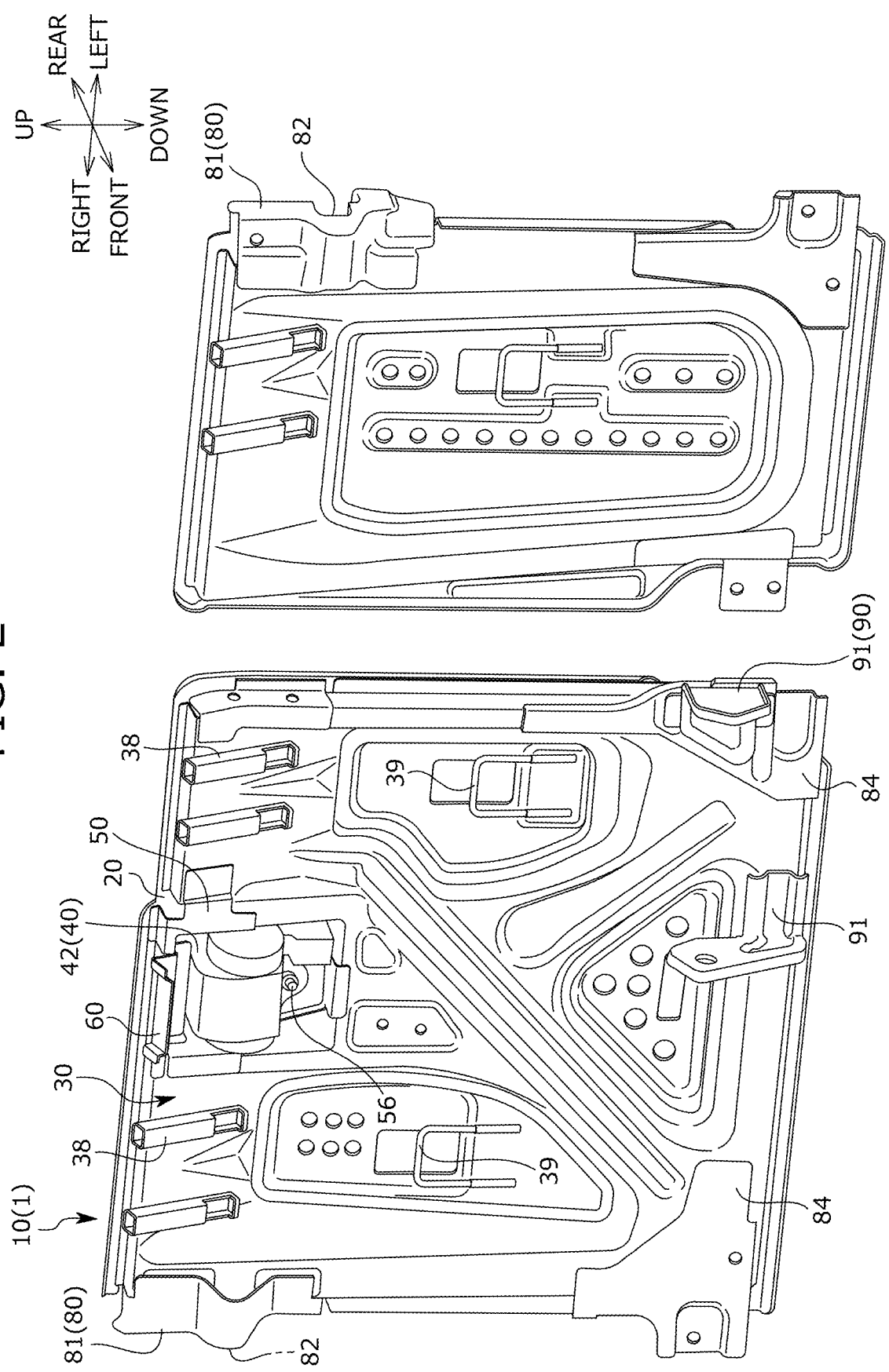
FIG. 2 is a perspective view of a back frame, a belt retractor, and a retractor bracket.

As shown in FIGS. 1 and 2, the conveyance seat S includes the seat body including a seat back 1, a seat cushion 2, a headrest 3, and an armrest 4; a seat belt device 40 that is attached to the inside of the seat back 1, and that restrains the upper body of the seated occupant; a retractor bracket 50 for assembling a belt retractor 42 of the seat belt device 40; and a belt guide bracket 60 that guides a seat belt 41 extending from the belt retractor 42.

In addition, the conveyance seat S includes a support leg 70 that is attached between the seat cushion 2 and the vehicle body floor, and that supports the seat body; a switching device 80 that is attached to a side portion of the seat back 1, and that switches the seat body from the "normal state" to the "storage state"; and an arm lock device 90 that rotatably connects the armrest 4 to the seat back 1.

As shown in FIGS. 1 and 2, the seat back 1 is a backrest portion that supports the back of the occupant from behind, and includes a back frame 10 serving as a skeleton; a pad material 1a that is placed on the back frame 10; and a skin material 1b that covers the back frame 10 and the pad material 1a.

The seat cushion 2 is a seating portion that supports the occupant from below, and includes a cushion frame serving as a skeleton; a pad material 2a that is placed on the cushion frame; and a skin material 2b that covers the cushion frame and the pad material 2a.

The headrest 3 is a head portion that supports the head of the occupant from behind, and includes headrest pillars serving as a core material; a pad material 3a that is placed on the headrest pillars; and a skin material 3b that covers the headrest pillars and the pad material 3a.

The armrest 4 is a member that supports an arm of the seated occupant from below, and is also referred to as a center armrest.

Figure 3:
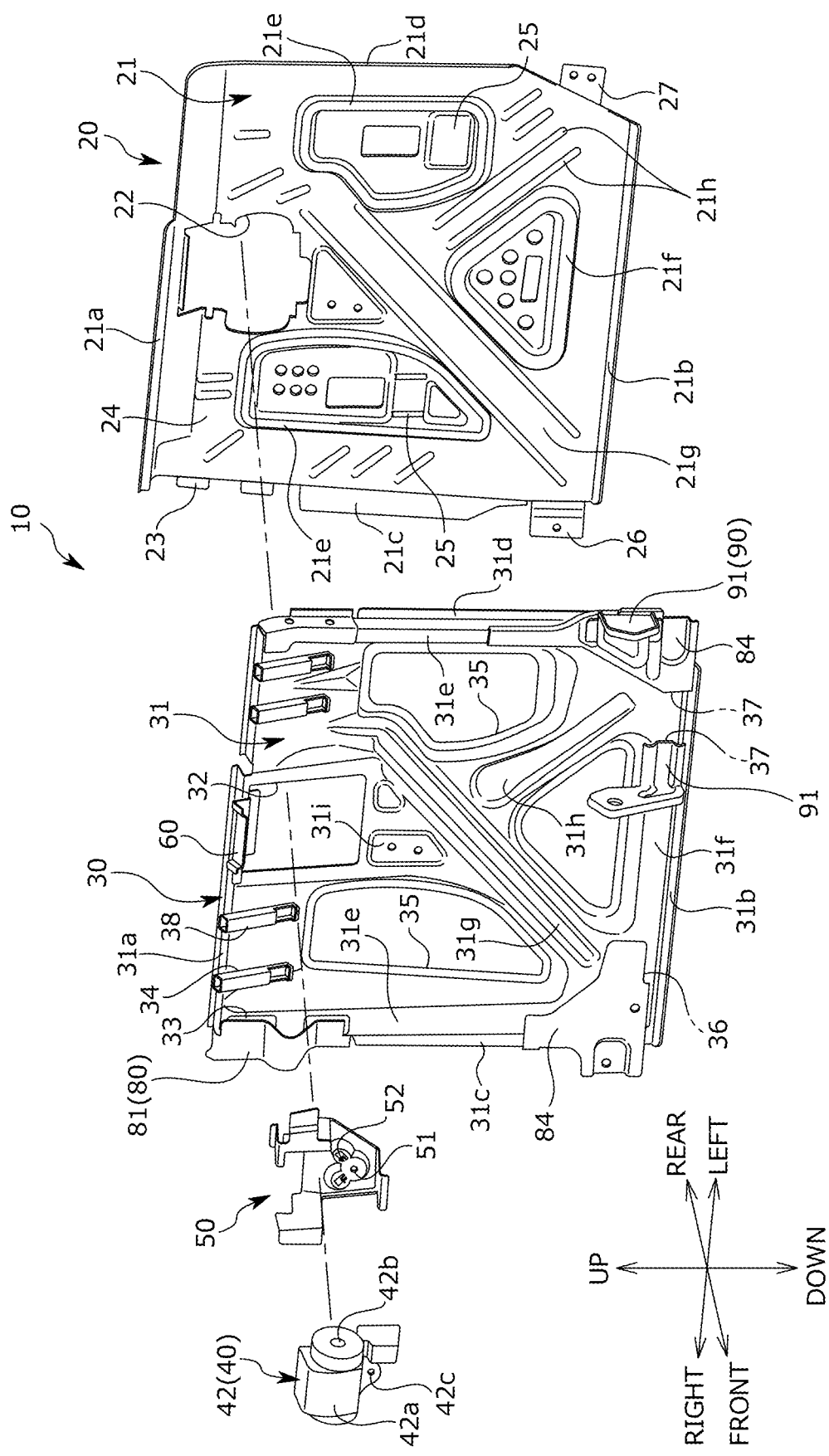
FIG. 3 is an exploded perspective view of the back frame, the belt retractor, and the retractor bracket.
Figure 4:
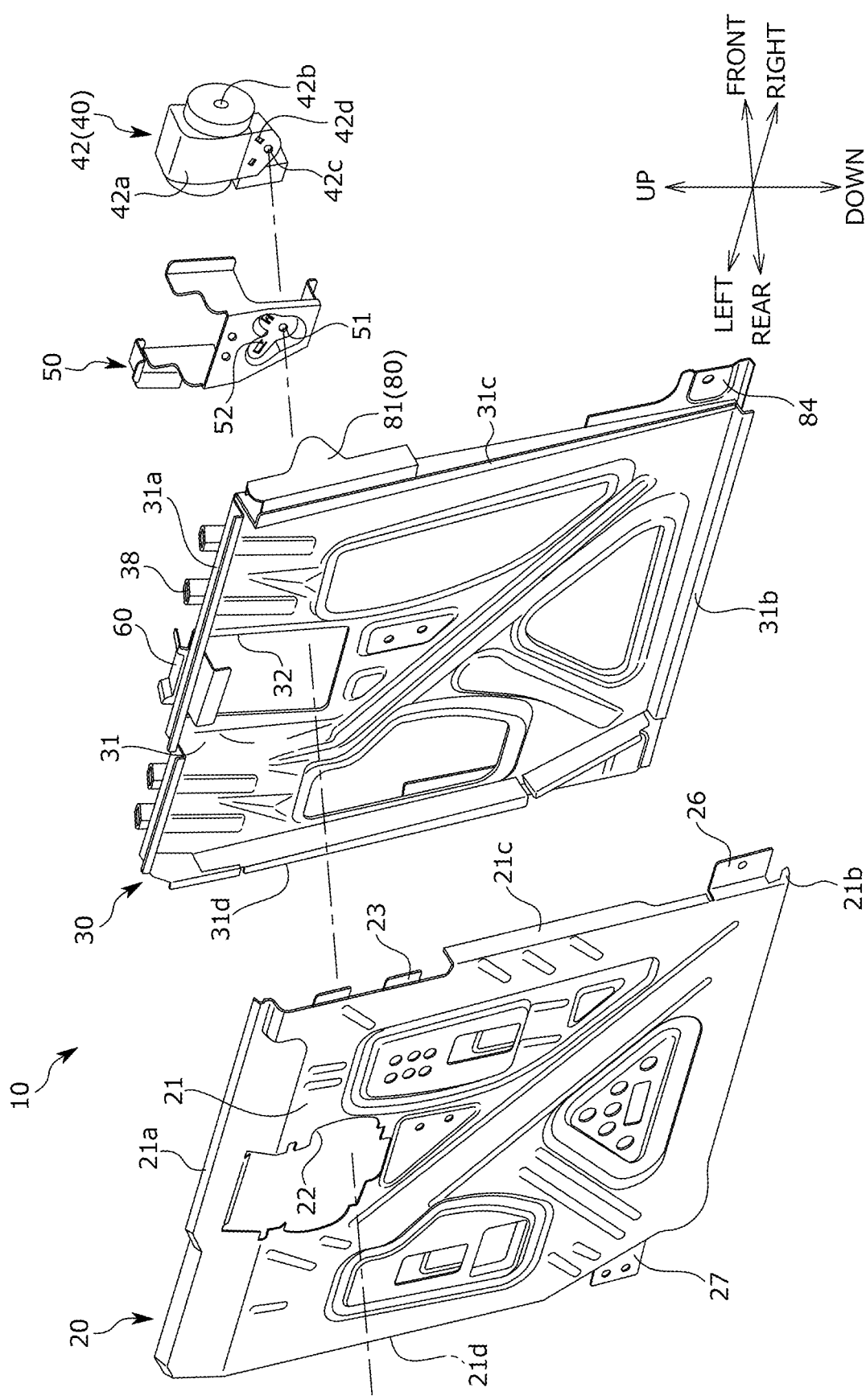
FIG. 4 is an exploded perspective view of the back frame, the belt retractor, and the retractor bracket when viewed from behind the seat.

As shown in FIGS. 2 to 4, the back frame 10 is a substantially rectangular frame body serving as the skeleton of the seat back 1, and includes a rear frame 20 having a plate shape and forming an outer shape of the back frame 10, and a front frame 30 having a plate shape which is assembled to a front surface of the rear frame 20.

In detail, the back frame 10 is formed by assembling the rear frame 20 and the front frame 30 in a thickness direction of the back frame 10.

For example, the rear frame 20 and the front frame 30 can be integrally assembled by welding the rear frame 20 and the front frame 30 in a state where the rear frame 20 and the front frame 30 face each other (by laser-welding the rear frame 20 and the front frame 30 from in front of the seat or from behind the seat).

As shown in FIGS. 2 to 4, the rear frame 20 is a plate-shaped panel frame, and includes a frame body 21 having a rectangular shape; a first through-hole 22 for assembling the belt retractor 42; vehicle body attachment portions 23 for assembling the switching device 80 (vehicle body attachment bracket 81); pillar attachment portions 24 for assembling pillar guides 38; an anchor attachment portion 25 for assembling a child seat anchor 39; shaft attachment portions 26 for assembling the switching device 80 (set bracket 84); and an arm attachment portion 27 for assembling the armrest 4 (arm brackets 91).

The frame body 21 has an uneven structure in which the frame body 21 is partially bulged forward and rearward. In addition, flanges are formed at an outer edge of the frame body 21.

Specifically, an upper end flange 21a, a lower end flange 21b, a right end flange 21c, and a left end flange 21d are formed at the outer edge of the frame body 21. In addition, forward bulging portions 21e and 21f that are bulged forward are formed at right and left side portions and a lower portion of the frame body 21, respectively. In addition, forward bulging portions 21g and 21h that are bulged forward are formed on diagonal lines of the frame body 21.

For that reason, the rigidity of the rear frame 20 can be increased.

A plurality of openings are formed at intervals in an up to down direction and the right to left direction on a front surface of the frame body 21. For that reason, the weight of the rear frame 20 can be reduced.

The first through-hole 22 is a substantially rectangular through-hole penetrating through the rear frame 20 in a thickness direction of the rear frame 20, and is formed at an upper portion of the rear frame 20.

The first through-hole 22, the right and left vehicle body attachment portions 23, and the right and left pillar attachment portions 24 are disposed at positions overlapping each other in the up to down direction (at the same height position).

In addition, the right and left shaft attachment portions 26 and the arm attachment portion 27 are disposed at positions overlapping each other in the up to down direction (at the same height position).

As shown in FIGS. 2 to 4, the front frame 30 is a plate-shaped panel frame, and includes a frame body 31 having a rectangular shape; a second through-hole 32 for assembling the belt retractor 42; vehicle body attachment portions 33 for assembling the switching device 80 (vehicle body attachment bracket 81); pillar attachment portions 34 for assembling the pillar guides 38; an anchor attachment portion 35 (anchor attachment hole) for assembling the child seat anchor 39; shaft attachment portions 36 for assembling the switching device 80 (set bracket 84); and an arm attachment portion 37 for assembling the armrest 4 (arm brackets 91).

The frame body 31 has an uneven structure in which the frame body 31 are partially bulged forward and rearward. In addition, flanges are formed at an outer edge of the frame body 31.

Specifically, an upper end flange 31a, a lower end flange 31b, a right end flange 31c, and a left end flange 31d are formed at the outer edge of the frame body 31. In addition, forward bulging portions 31e and 31f that are bulged forward are formed at right and left side portions and a lower end portion of the frame body 31, respectively. In addition, rearward bulging portions 31g and 31h, each of which is bulged rearward, are formed on diagonal lines of the frame body 31. In addition, a rearward bulging portion 31i is also formed at a central portion of the frame body 31.

For that reason, the rigidity of the front frame 30 can be increased. In addition, by butting the rearward bulging portions of the front frame 30 and the forward bulging portions of the rear frame 20 against each other and welding the rearward bulging portions and the forward bulging portions, the rigidity of the back frame 10 can be further increased.

The front frame 30 is assembled to adhere to the rear frame 20 in a state where the first through-hole 22 and the second through-hole 32 communicate with each other.

The second through-hole 32 is a substantially rectangular through-hole penetrating through the front frame 30 in a thickness direction of the front frame 30, and is formed at an upper portion of the front frame 30. The second through-hole 32 is disposed at a position facing the first through-hole 22.

The second through-hole 32, the right and left vehicle body attachment portions 33, and the right and left pillar attachment portions 34 are disposed at positions overlapping each other in the up to down direction (at the same height position).

In addition, the right and left shaft attachment portions 36 and the arm attachment portion 37 are disposed at positions overlapping each other in the up to down direction (at the same height position).

In the above-described configuration, as shown in FIGS. 3 and 4, the first through-hole 22 and the second through-hole 32 are formed to be larger than the belt retractor 42 in the up to down direction and the width direction of the back frame 10.

For that reason, the assembly work of the belt retractor 42 can be facilitated.

Figure 6:
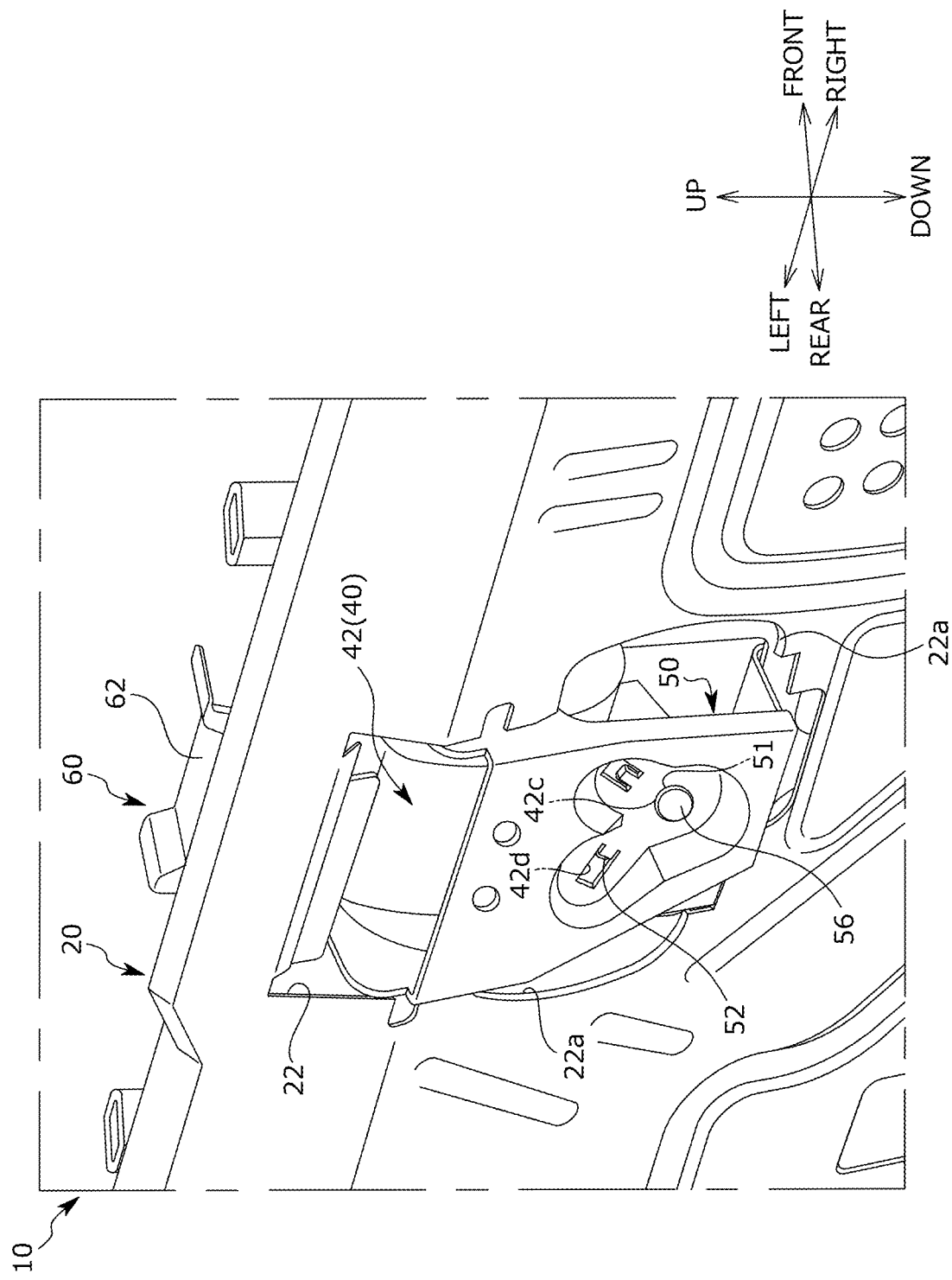
FIG. 6 is a perspective view (enlarged view of main portions) of the back frame, the belt retractor, and the retractor bracket when viewed from behind the seat.

In the above-described configuration, as shown in FIG. 6, a reinforcing flange 22a extending along an edge portion of the first through-hole 22 of the rear frame 20 is formed at the edge portion of the first through-hole 22.

For that reason, the rigidity of a portion of the back frame 10, the belt retractor 42 being assembled to the portion, can be increased.

Figure 8:
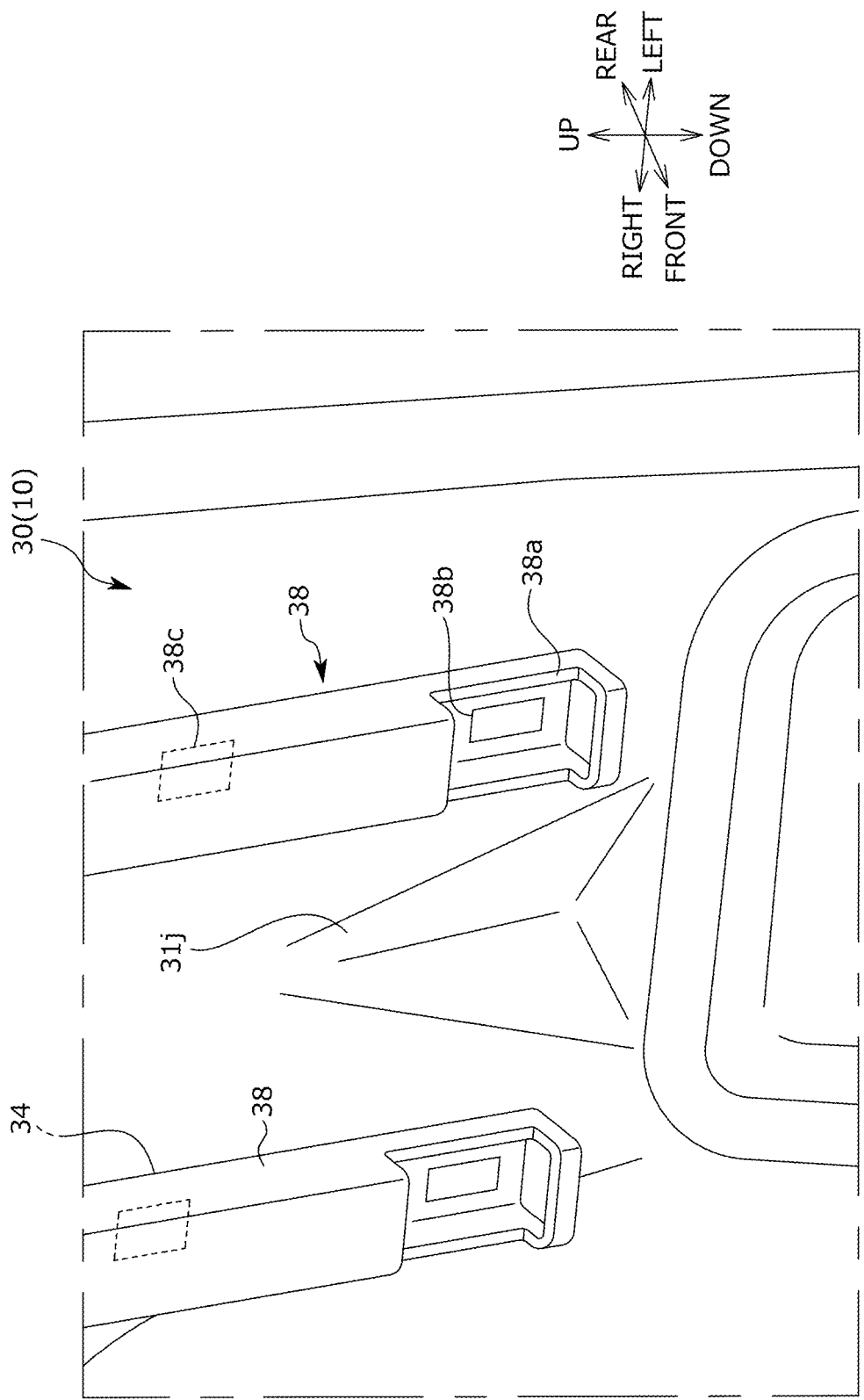
FIG. 8 is an enlarged view of main portions of FIG. 2, and is a view showing pillar guides.

In the above-described configuration, as shown in FIG. 8, a reinforcing bead 31j having a substantially triangular shape and being bulged toward the rear of the seat is formed at a portion of the front frame 30 between the right and left pillar guides 38. For that reason, the assembly rigidity of the pillar guides 38 of the back frame 10 can be increased.

Openings 38a having a rectangular shape are formed on front surfaces of lower portions of the pillar guides 38. For that reason, the weight of the pillar guides 38 can be reduced. In addition, a plurality of fixing portions 38b and 38c (welded portions) of the pillar guides 38 are formed on a front surface of the back frame 10 at intervals in the up to down direction. Hence, rotation of the pillar guides 38 can be suppressed.

As shown in FIGS. 1 to 4, the seat belt device 40 includes the seat belt 41 that restrains the upper body of the seated occupant; the belt retractor 42 that is attached to the back frame 10, and that extractably retracts the seat belt 41; and a belt guide 43 that is attached to the back frame 10 at a position above the belt retractor 42, and that guides the seat belt 41 extracted from the belt retractor 42.

As shown in FIG. 1, the seat belt 41 is extracted from a belt extraction hole located at an upper end portion of the belt retractor 42, and extends toward the top of the seat. The extension portion extending upward is guided toward the front of the seat along an outer peripheral surface of an upper end portion of the back frame 10. The extension portion extending toward the front of the seat comes into contact with an upper surface of the belt guide 43, and is guided toward the bottom of the seat along the belt guide 43.

A belt tongue plate 41a is attached to the seat belt 41, and the belt tongue plate 41a is connected to a belt buckle (not shown).

As shown in FIGS. 3 to 7, the belt retractor 42 is provided inside the first through-hole 22 and the second through-hole 32 of the back frame 10, and is disposed at a position overlapping the rear frame 20 and the front frame 30 in the thickness direction of the back frame 10.

The belt retractor 42 is assembled to the back frame 10 via the retractor bracket 50.

The belt retractor 42 is a box-shaped module, and includes a retractor body 42a; a rotating shaft 42b supported by the retractor body 42a, and serving as the rotation center of the seat belt 41; an attachment portion 42c (attachment hole) disposed at a position below the rotating shaft 42b, and attached to the retractor bracket 50; and a positioning portion 42d that is disposed between the rotating shaft 42b and the attachment portion 42c, and that positions the belt retractor 42.

Figure 7:
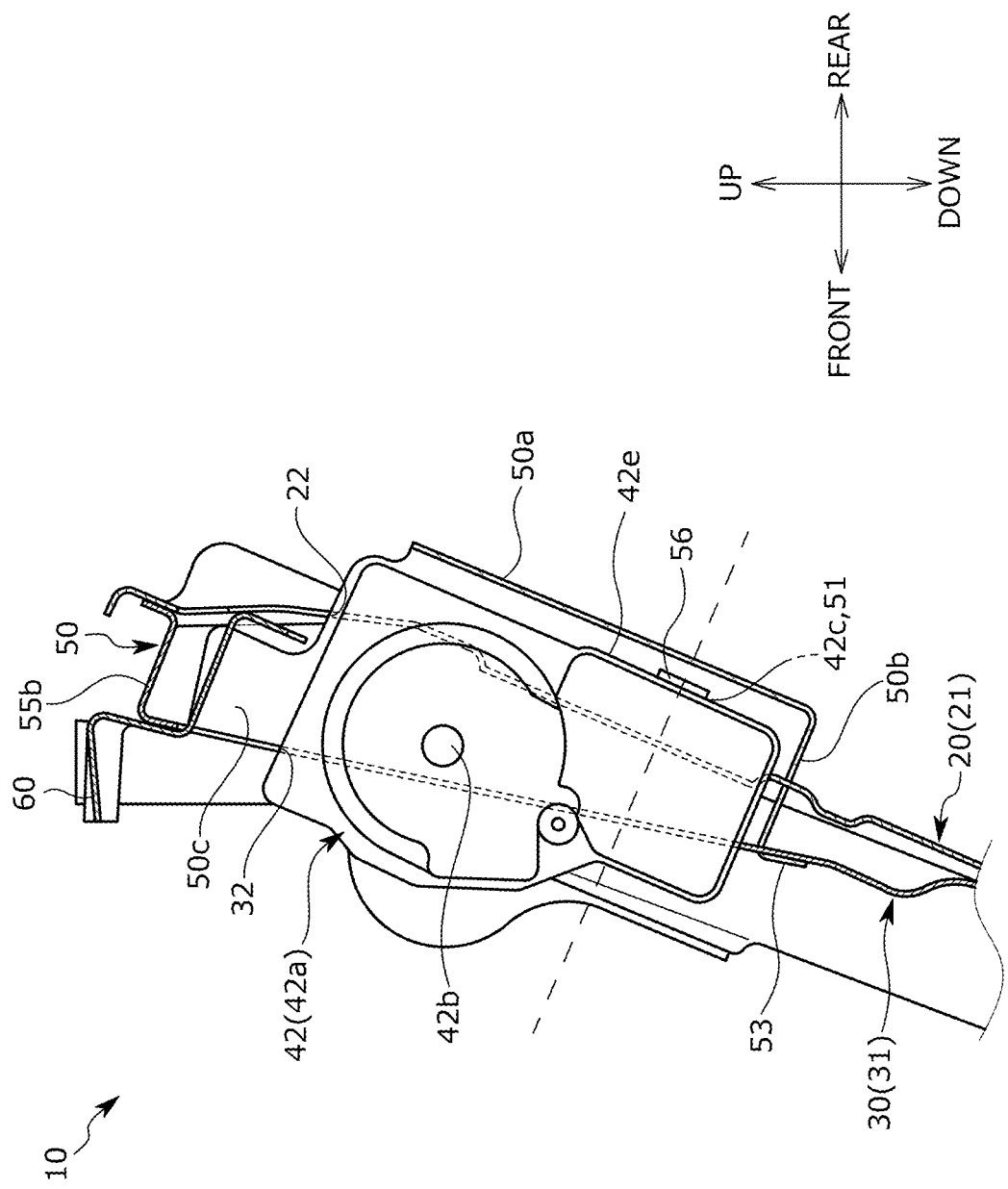
FIG. 7 is a side cross-sectional view of the back frame, the belt retractor, and the retractor bracket.

In the above-described configuration, as shown in FIG. 7, a rear end portion 42e of the belt retractor 42 is disposed at a position behind the rear frame 20 in the thickness direction of the back frame 10 (in a side view of the back frame 10).

For that reason, the forward projection of the belt retractor 42 from the back frame 10 can be suppressed, and seating feeling can be improved.

In the above-described configuration, as shown in FIG. 7, the rotating shaft 42b of the belt retractor 42 is disposed at a position behind the front frame 30 in the thickness direction of the back frame 10. In addition, the rotating shaft 42b of the belt retractor 42 is disposed at a position in front of the rear frame 20 in the thickness direction of the back frame 10.

For that reason, the rotating shaft 42b of the belt retractor 42 can be suitably protected in the thickness direction of the back frame 10.

The belt guide 43 shown in FIG. 1 is disposed at the upper end portion of the back frame 10, and is assembled to the back frame 10 via the belt guide bracket 60.

Similarly to the belt retractor 42, the belt guide 43 is disposed at a position overlapping the rear frame 20 and the front frame 30 in the thickness direction of the back frame 10.

As shown in FIGS. 3 to 7, the retractor bracket 50 is a bracket for assembling the belt retractor 42 to the back frame 10, and is attached inside the first through-hole 22 and the second through-hole 32.

Specifically, the retractor bracket 50 is attached to span an outer edge portion of the second through-hole 32 of the front frame 30.

The retractor bracket 50 is disposed at a position overlapping the rear frame 20 and the front frame 30 in the thickness direction of the back frame 10.

The retractor bracket 50 includes a body wall portion 50a that is long in the up to down direction; a bottom wall portion 50b extending forward from a lower end portion of the body wall portion 50a; and right and left side wall portions 50c extending forward from both end portions of the body wall portion 50a in the width direction.

The retractor bracket 50 includes a retractor attachment portion 51 (attachment hole) and a retractor positioning portion 52 (positioning hook) that are formed on the body wall portion 50a, and that are intended for assembling the belt retractor 42.

In addition, the retractor bracket 50 includes a first frame attachment portion 53 that is formed at an extension end portion of the bottom wall portion 50b, and that is hooked onto a front surface of the front frame 30, and a second frame attachment portion 54 and a third frame attachment portion 55 that are formed at extension end portions of the right and left side wall portions 50c, respectively, and that are hooked onto the front surface of the front frame 30.

The retractor attachment portion 51 is connected to the belt retractor 42 by fastening an attachment bolt 56 in a state where the retractor attachment portion 51 is in contact with the belt retractor 42 (attachment portion 42c).

The retractor positioning portion 52 positions the belt retractor 42 by being hooked onto the belt retractor 42 (positioning portion 42d).

The retractor attachment portion 51 and the retractor positioning portion 52 are formed on a front surface of a bulging portion 50d, which is bulged, of the body wall portion 50a. For that reason, the assembly rigidity can be increased.

Each of the frame attachment portions 53, 54, and 55 spans the outer edge portion of the second through-hole 32 of the front frame 30.

Specifically, the frame attachment portions 53, 54, and 55 and the outer edge portion of the second through-hole 32 are overlapped and welded.

The third frame attachment portion 55 includes a front wall portion 55a overlapping a front surface of the outer edge portion of the second through-hole 32; an upper wall portion 55b protruding rearward from an upper end portion of the front wall portion 55a, and overlapping an upper surface of the front frame 30; a side wall portion 55c protruding rearward from a side end portion of the front wall portion 55a, and overlapping a side surface of the outer edge portion of the second through-hole 32; and a reinforcing wall portion 55d protruding laterally from a rear end portion of the side wall portion 55c, and overlapping the front surface of the front frame.

In the above-described configuration, as shown in FIG. 7, the retractor attachment portion 51 is disposed at a position behind the front frame 30 in the thickness direction of the back frame 10.

For that reason, the belt retractor 42 can be suitably protected from a seat front side.

Figure 5:
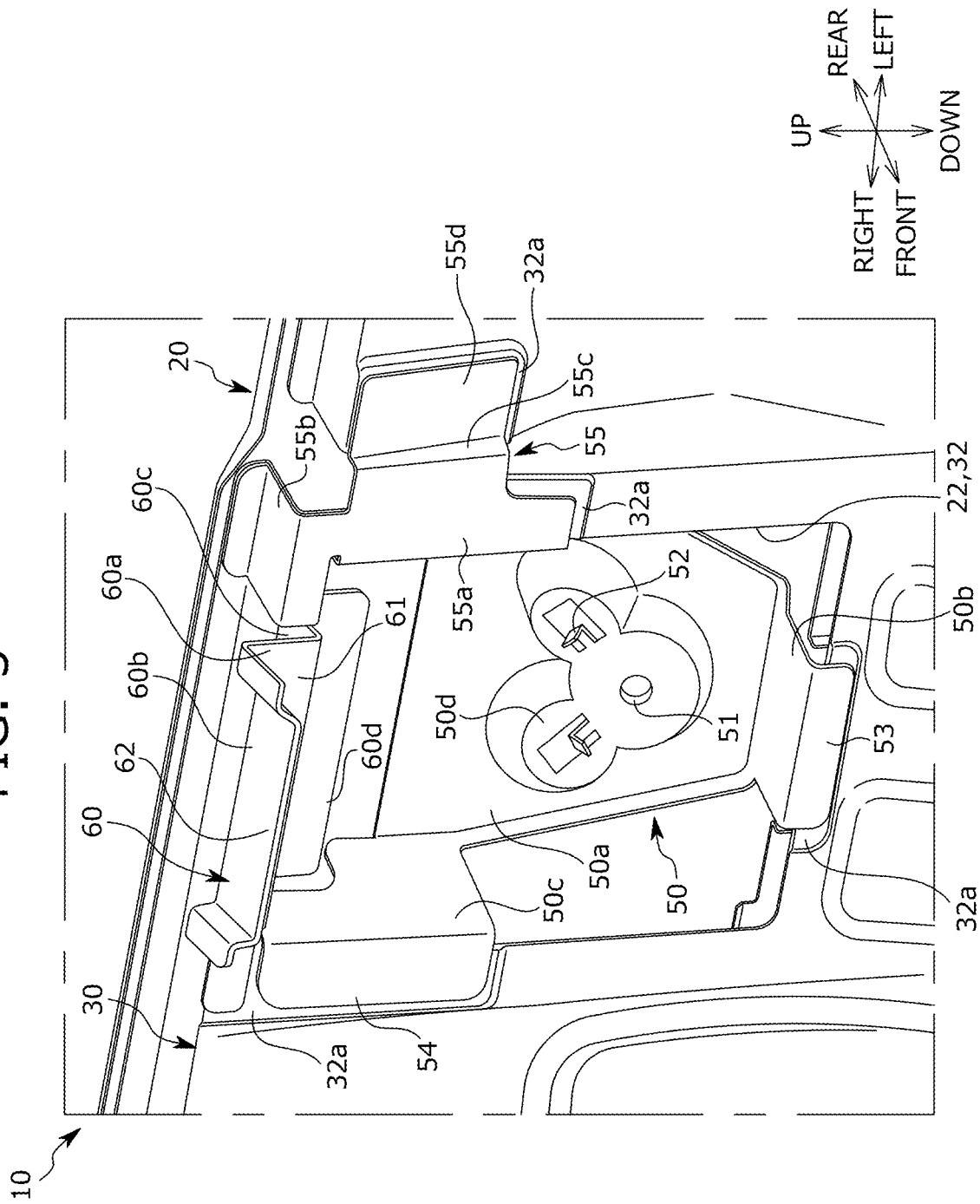
FIG. 5 is an enlarged view of main portions of FIG. 2, and is a view showing the retractor bracket and a belt guide bracket.

In the above-described configuration, as shown in FIG. 5, reinforcing portions 32a having a protruding shape are formed at portions of the front surface of the front frame 30, the frame attachment portions 53, 54, and 55 being attached to the portions.

Hence, the rigidity of portions of the back frame 10, the belt retractor 42 being assembled to the portions, can be improved.

The reinforcing portions 32a may be reinforcing protrusions or may be reinforcing recesses. The reinforcing portions 32a may be reinforcing flanges, reinforcing beads, or the like.

As shown in FIGS. 5 to 7, the belt guide bracket 60 is a bracket for assembling the belt guide 43 to the back frame 10, and is attached inside the first through-hole 22 and the second through-hole 32.

Specifically, the belt guide bracket 60 is attached to the outer edge portion of the second through-hole 32 of the front frame 30.

A part of the belt guide bracket 60 is disposed at a position overlapping the rear frame 20 and the front frame 30 in the thickness direction of the back frame 10, and is disposed at a position above the retractor bracket 50.

The belt guide bracket 60 includes a front wall portion 60a that is long in the seat width direction; an upper wall portion 60b extending forward from an upper end portion of the front wall portion 60a; a bottom wall portion 60c extending rearward from a lower end portion of the front wall portion 60a; and a rear wall portion 60d extending downward from an extension end portion of the bottom wall portion 60c.

The belt guide bracket 60 includes a frame attachment portion 61 that is formed on the front wall portion 60a, and that is welded to the front surface of the front frame 30.

In addition, the belt guide bracket 60 includes a guide support portion 62 that is formed on the upper wall portion 60b, and that supports the belt guide 43 from below.

As shown in FIG. 1, the support leg 70 is a substantially U-shaped pipe member that supports seat cushion 2.

The support leg 70 includes leg body portions 71 disposed at right and left positions in the seat width direction, and a leg connecting portion 72 connecting lower end portions of the leg body portions 71.

Upper end portions of the leg body portions 71 are connected to the inside of the seat cushion 2. In addition, a central portion of the leg connecting portion 72 in the seat width direction is detachably held by a leg holding member 73 located on the vehicle body floor.

An upper end portion of the support leg 70 projects further toward the front of the seat than a lower end portion of the support leg 70, and the support leg 70 is inclined forward and upward from the lower end portion toward the upper end portion of the support leg 70.

As shown in FIGS. 1 to 4 and 9, the switching device 80 is a device that switches the conveyance seat S from the "normal state" to the "storage state", and is assembled to the side portion of the back frame 10.

The switching device 80 includes the vehicle body attachment bracket 81 that is attached to an upper portion of the back frame 10; a lock member 82 that detachably engages with a striker that is a part of the vehicle body, and that locks rotational operation of the back frame 10; the operating lever 83 that is operated to release a locked state of the back frame 10; and a connecting cable connecting the lock member 82 and the operating lever 83.

Figure 9:
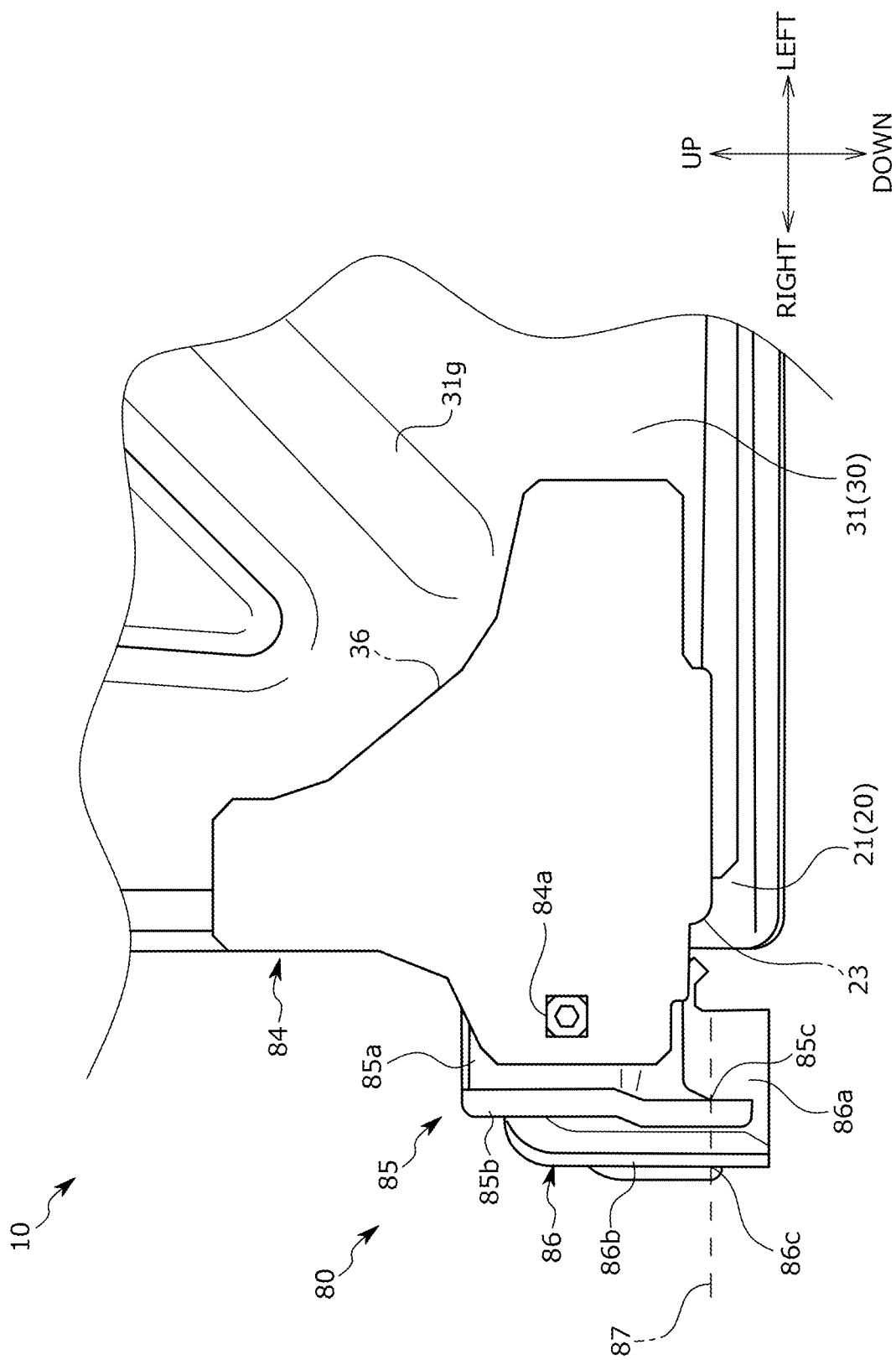
FIG. 9 is a front view of the back frame, a set bracket, and a shaft support bracket.

In addition, as shown in FIG. 9, the switching device 80 includes the set bracket 84 that is attached to a lower end portion of the back frame 10; an intermediate bracket 85 that is attached to the set bracket 84, and that protrudes outward in the seat width direction; and a pivot bracket 86 that is attached to the intermediate bracket 85, and that supports a rotating shaft 87.

A spiral spring that biases the back frame 10 toward the seat front side is assembled around the rotating shaft 87.

When the seat body is in the "normal state", the operation of the operating lever 83 allows the switching device 80 to release a locked state of the lock member 82.

When the locked state is released, the seat body is switched to the "storage state" where the seat back 1 is tilted forward by the biasing force of the spiral spring (not shown) to be folded together with the seat cushion 2 and is stored on the vehicle body floor.

Upon the rotational operation of the seat back 1, the support legs 70 can be rotated toward a seat cushion 2 side and folded.

As shown in FIG. 9, the set bracket 84 is assembled to a corner portion of the front surface of the back frame 10. The set bracket 84 is provided to project outward in the seat width direction from the back frame 10, and includes an attachment portion 84a that is attached to the intermediate bracket 85.

The intermediate bracket 85 is a bracket having an L-shaped cross-section, and includes a bottom wall portion 85a overlapping the attachment portion 84a of the set bracket 84, and an outer wall portion 85b protruding forward from an outer end portion of the bottom wall portion 85a. The intermediate bracket 85 includes a shaft support portion 85c that is formed in the outer wall portion 85b, and that supports the rotating shaft 87.

The pivot bracket 86 is a bracket having an L-shaped cross-section, and includes a bottom wall portion 86a overlapping the attachment portion 84a of the set bracket 84, and an outer wall portion 86b protruding forward from an outer end portion of the bottom wall portion 86a. The pivot bracket 86 includes a shaft support portion 86c that is formed in the outer wall portion 86b, and that supports the rotating shaft 87.

In the above-described configuration, as shown in FIG. 9, the set bracket 84 (attachment portion 84a), the intermediate bracket 85 (bottom wall portion 85a), and the pivot bracket 86 (bottom wall portion 86a) are disposed at positions overlapping each other in a thickness direction of the seat back 1, and are fastened together.

For that reason, the assembly rigidity of the brackets and the rotating shaft 87 can be increased.

In the above-described configuration, as shown in FIG. 9, the attachment portion 84a and the shaft support portion 85c (shaft support portion 86c) are disposed at different positions in the seat front to rear direction, the seat width direction, and the up to down direction.

By separating fixing points between the brackets and the rotation center of the rotating shaft 87 from each other in such a manner, the switching device 80 can be smoothly operated.

Through a series of the operations described above, the seat body is stored on the vehicle body floor, and the conveyance seat S is switched from the "normal state" to the "storage state".

When the occupant wants to return the conveyance seat S from the "storage state" to the "normal state", the occupant may switch the back frame 10 to a locked state by lifting the seat body with a hand against the biasing force of the spiral spring (not shown) and engaging the lock member 82 of the switching device 80 with the striker.

As shown in FIGS. 1 to 4, the arm lock device 90 is a device that rotatably connects the armrest 4 to the back frame 10, and that locks the rotational operation of the armrest 4, and is attached to a side portion of the back frame 10.

The arm lock device 90 includes the arm brackets 91 that are attached to a lower portion of the back frame 10.

The arm lock device 90 is assembled to the arm brackets 91, and further includes an arm rotating shaft serving as the rotating shaft of the armrest 4; an arm lock member that locks the rotational operation of the armrest 4; an arm operating lever that is operated to release a locked state of the armrest 4; and a connecting cable that connects the arm lock member and the arm operating lever.

As shown in FIG. 2, the arm brackets 91 are brackets having an L-shaped cross-section, and are assembled to a central portion of the front surface of the back frame 10 and a corner portion.

In detail, the right arm bracket 91 is attached to the front surface of the back frame 10, and the left arm bracket 91 is attached to a front surface of the set bracket 84.

Other Embodiments

In the above-described embodiment, the conveyance seat S is formed as a rear seat of a vehicle, but is not particularly limited, and may be a front seat of a vehicle, or may be a middle seat in a vehicle including three rows of seats.

In the above-described embodiment, the conveyance seat S is a seat capable of switching seat arrangement between the "normal state" and the "storage state (movement state)", but is not particularly limited, and may be a seat capable of providing seat arrangement in three types of modes: for example, the "normal state", the "storage state (movement state)", and a "tip-up state (movement state)" in which the seat body is flipped up.

In the above-described embodiment, as shown in FIG. 2, the conveyance seat S is directly fixed to the vehicle body floor, but is not particularly limited. The conveyance seat S may include a rail device that supports the seat body to be movable in the front to rear direction, and may be indirectly fixed onto the vehicle body floor via the rail device.

In the above-described embodiment, when the frames are assembled together or when the frame and the bracket are assembled together, laser welding or arc welding is adopted; however, the welding method is not particularly limited, and various other welding methods such as spot welding may be adopted. Each component may be attached by methods other than welding.

In the above-described embodiment, the vehicle seat that can be stored and that is used in automobiles has been described as a specific example; however, the present invention is not particularly limited thereto, and the conveyance seat can also be used as a conveyance seat for airplanes, ships, and the like, in addition to a vehicle seat for trains, buses, and the like.

In the present embodiment, the conveyance seat S according to the present invention has been mainly described.

However, the above-described embodiment is merely one example for facilitating understanding of the present invention, and does not limit the present invention. The present invention can be changed and improved without departing from the concept of the present invention, and it goes without saying that the present invention includes its equivalents.

REFERENCE SIGNS LIST

S Conveyance seat
1 Seat back
1*a*, 2*a*, 3*a* Pad material
1*b*, 2*b*, 3*b* Skin material
2 Seat cushion
3 Headrest
4 Armrest
10 Back frame
20 Rear frame
21 Frame body
21*a* Upper end flange
21*b* Lower end flange
21*c* Right end flange
21*d* Left end flange
21*e*, 21*f*, 21*g*, 21*h* Forward bulging portion
22 First through-hole
22*a* Reinforcing flange (Rear reinforcing portion)
23 Vehicle body attachment portion
24 Pillar attachment portion
25 Anchor attachment portion
26 Shaft attachment portion
27 Arm attachment portion
30 Front frame
31 Frame body
31*a* Upper end flange
31*b* Lower end flange
31*c* Right end flange
31*d* Left end flange
31*e*, 31*f* Forward bulging portion
31*g*, 31*h*, 31*i* Rearward bulging portion
31*j* Reinforcing bead
32 Second through-hole
32*a* Reinforcing portion (Front reinforcing portion)
33 Vehicle body attachment portion
34 Pillar attachment portion
35 Anchor attachment portion (anchor attachment hole)
36 Shaft attachment portion
37 Arm attachment portion
38 Pillar guide
38*a* Opening
38*b*, 38*c* Fixing portion
39 Child seat anchor
40 Seat belt device
41 Seat belt
41*a* Belt tongue plate
42 Belt retractor
42*a* Retractor body
42*b* Rotating shaft
42*c* Attachment portion (attachment hole)
42*d* Positioning portion
42*e* Rear end portion
43 Belt guide
50 Retractor bracket
50*a* Body wall portion
50*b* Bottom wall portion
50*c* Side wall portion
50*d* Bulging portion
51 Retractor attachment portion (attachment hole)
52 Retractor positioning portion (positioning hook)
53 First frame attachment portion
54 Second frame attachment portion 55 Third frame attachment portion
55a Front wall portion
55b Upper wall portion
55c Side wall portion
55d Reinforcing wall portion
56 Attachment bolt
60 Belt guide bracket
60a Front wall portion
60b Upper wall portion
60c Bottom wall portion
60d Rear wall portion
61 Frame attachment portion
62 Guide support portion
70 Support leg
71 Leg body portion
72 Leg connecting portion
73 Leg holding member
80 Switching device
81 Vehicle body attachment bracket
82 Lock member
83 Operating lever
84 Set bracket
84a Attachment portion
85 Intermediate bracket
85a Bottom wall portion
85b Outer wall portion
85c Shaft support portion
86 Pivot bracket
86a Bottom wall portion
86b Outer wall portion
86c Shaft support portion
87 Rotating shaft
90 Arm lock device
91 Arm bracket

What is claimed is:

1. A conveyance seat, comprising:
a back frame serving as a skeleton of a seat back; and
a belt retractor that is attached to the back frame, and that retracts a seat belt,
wherein the back frame includes a rear frame having a plate shape and constituting the back frame, and a front frame that is assembled to a front surface of the rear frame,
a first through-hole penetrating through the rear frame in a thickness direction of the rear frame is formed in the rear frame,
a second through-hole provided at a position facing the first through-hole and penetrating through the front frame in a thickness direction of the front frame is formed in the front frame,
the front frame is assembled to the rear frame in a state where the first through-hole and the second through-hole communicate with each other, and
the belt retractor is provided inside the first through-hole and the second through-hole of the back frame, and is disposed at a position overlapping the rear frame and the front frame in a thickness direction of the back frame.

2. The conveyance seat according to claim 1,
wherein a rear end portion of the belt retractor is disposed at a position behind the rear frame in the thickness direction of the back frame.

3. The conveyance seat according to claim 1,
wherein the first through-hole and the second through-hole are formed to be larger than the belt retractor in an up to down direction and a width direction of the back frame.

4. The conveyance seat according to claim 1,
wherein the belt retractor rotationally rotates to retract the seat belt, and
a rotating shaft of the belt retractor is disposed at a position behind the front frame in the thickness direction of the back frame.

5. The conveyance seat according to claim 1,
wherein the belt retractor rotationally rotates to retract the seat belt, and
a rotating shaft of the belt retractor is disposed at a position in front of the rear frame in the thickness direction of the back frame.

6. The conveyance seat according to claim 1,
wherein the back frame includes a retractor bracket for attaching the belt retractor, and
the retractor bracket is provided inside the first through-hole and the second through-hole, and is disposed at a position overlapping the rear frame and the front frame in the thickness direction of the back frame.

7. The conveyance seat according to claim 6,
wherein the retractor bracket includes a retractor attachment portion for attaching the belt retractor, and
the retractor attachment portion is disposed at a position behind the front frame in the thickness direction of the back frame.

8. The conveyance seat according to claim 6,
wherein the retractor bracket includes a frame attachment portion for attachment to a front surface of the front frame, and
a front reinforcing portion is formed at a portion of the front surface of the front frame, the frame attachment portion being attached to the portion.

9. The conveyance seat according to claim 1,
wherein a rear reinforcing portion extending along an edge portion of the first through-hole of the rear frame is formed at the edge portion of the first through-hole.

10. The conveyance seat according to claim 1, further comprising:
a switching device that switches the seat back between a normal state and a movement state where the seat back is moved from the normal state,
wherein the switching device is provided at a side portion of the back frame, and includes a lock member that locks a movement operation of the seat back when the seat back is in the normal state, and
the lock member and the belt retractor are disposed at the same height position on the back frame.

* * * * *